(12) United States Patent
Kishimoto et al.

(10) Patent No.: US 8,777,756 B2
(45) Date of Patent: Jul. 15, 2014

(54) SERVER DEVICE, NON-TRANSITORY SERVER DEVICE-READABLE STORAGE MEDIUM, AND GAME SYSTEM

(71) Applicant: DeNA Co., Ltd., Tokyo (JP)

(72) Inventors: Yuji Kishimoto, Tokyo (JP); Hisashi Sakamoto, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/895,188

(22) Filed: May 15, 2013

(65) Prior Publication Data

US 2014/0004958 A1    Jan. 2, 2014

(30) Foreign Application Priority Data

Jun. 29, 2012  (JP) .................................. 2012-147664

(51) Int. Cl.
*A63F 9/24*    (2006.01)

(52) U.S. Cl.
USPC .......... 463/42; 463/7; 463/9; 463/31; 463/32; 463/33; 463/39; 463/40; 463/41; 463/43; 709/204

(58) Field of Classification Search
USPC .............. 463/1, 7–9, 31–33, 39–43; 709/204; 705/14
See application file for complete search history.

(56) References Cited

U.S. PATENT DOCUMENTS

| | | | |
|---|---|---|---|
| 7,396,281 B2 * | 7/2008 | Mendelsohn et al. | 463/42 |
| 8,226,472 B2 * | 7/2012 | Van Luchene | 463/25 |
| 2006/0293103 A1 * | 12/2006 | Mendelsohn | 463/42 |
| 2008/0220876 A1 * | 9/2008 | Mehta et al. | 463/42 |
| 2012/0036189 A1 * | 2/2012 | Sadamoto | 709/204 |
| 2013/0035165 A1 * | 2/2013 | Satake et al. | 463/42 |

FOREIGN PATENT DOCUMENTS

JP    2003-126555 A    5/2003

* cited by examiner

*Primary Examiner* — Sunit Pandya
(74) *Attorney, Agent, or Firm* — Rothwell, Figg, Ernst & Manbeck, P.C.

(57) ABSTRACT

A server device connected to a first player terminal used by a first player and a second player terminal used by a second player to communicate with each other, including: a storage unit that stores player information in which each of items owned by players is associated with each of the players; a reception unit that receives, from the first player terminal, an exchange request to exchange a first item owned by the first player for a second item different from the first item, and receives, from the second player terminal after the exchange request, an acquisition request that the second player acquire the first item in an exchange source from the first player; a judging unit that judges whether or not the second player owns the second item based on the player information when the reception unit receives the acquisition request; and an item exchange processing unit.

6 Claims, 14 Drawing Sheets

| CARD ID | CHARACTER NAME | LEVEL | ATTACK POWER | DEFENSE POWER | HIT POINT |
|---|---|---|---|---|---|
| 0001 | WARRIOR A | LV.5 | 500 | 500 | 1000 |
| ⋮ | ⋮ | ⋮ | ⋮ | ⋮ | ⋮ |
| 0100 | WIZARD X | LV.15 | 2000 | 2000 | 8000 |
| ⋮ | ⋮ | ⋮ | ⋮ | ⋮ | ⋮ |
| 0105 | MARTIAL ARTIST Y | LV.16 | 1000 | 1000 | 6000 |
| ⋮ | ⋮ | ⋮ | ⋮ | ⋮ | ⋮ |

FIG. 4

| ITEM ID | ITEM NAME | PRICE |
|---|---|---|
| 001 | ITEM A | 300 |
| 002 | ITEM B | 400 |
| 003 | ITEM C | 500 |
| ⋮ | ⋮ | ⋮ |

FIG. 5

| PLAYER ID | VIRTUAL CURRENCY | OWNED CARD INFORMATION | OWNED ITEM INFORMATION | TRADE INFORMATION |
|---|---|---|---|---|
| 1 | 0 | OWNED CARD INFORMATION (1) | OWNED ITEM INFORMATION (1) | TRADE INFORMATION (1) |
| 2 | 500 | OWNED CARD INFORMATION (2) | OWNED ITEM INFORMATION (2) | TRADE INFORMATION (2) |
| 3 | 700 | OWNED CARD INFORMATION (3) | OWNED ITEM INFORMATION (3) | TRADE INFORMATION (3) |
| 4 | 1000 | OWNED CARD INFORMATION (4) | OWNED ITEM INFORMATION (4) | TRADE INFORMATION (4) |
| 5 | 100 | OWNED CARD INFORMATION (5) | OWNED ITEM INFORMATION (5) | TRADE INFORMATION (5) |
| 6 | 3000 | OWNED CARD INFORMATION (6) | OWNED ITEM INFORMATION (6) | TRADE INFORMATION (6) |
| . | . | . | . | . |
| . | . | . | . | . |
| . | . | . | . | . |

FIG. 6

| OWNED CARD INFORMATION (3) | | | | | | |
| OWNED CARD INFORMATION (2) | | | | | | TIME 0:00 2:00 |
| OWNED CARD INFORMATION (1) | | | | | | TIME 0:00 2:00 |
| OWNED CARD ID | LEVEL | ATTACK POWER | DEFENSE POWER | HIT POINT | ACQUISITION DATE AND TIME | TIME 0:00 2:00 |
| --- | --- | --- | --- | --- | --- | --- |
| 0011 | LV. 3 | 15 | 10 | 200 | 2012/2/13 10:00 | 2:00 1:30 |
| 0211 | LV. 4 | 20 | 23 | 150 | 2012/2/13 12:00 | 1:30 8:00 |
| 0133 | LV. 1 | 70 | 45 | 100 | 2012/2/14 11:30 | 8:00 3:30 |
| 0201 | LV. 4 | 22 | 40 | 600 | 2012/2/15 18:00 | 3:30 9:00 |
| 0072 | LV. 7 | 60 | 50 | 250 | 2012/2/16 13:30 | 9:00 |
| 0094 | LV. 1 | 300 | 200 | 450 | 2012/2/16 19:00 | |
| ⁚ | ⁚ | ⁚ | ⁚ | ⁚ | ⁚ | |

FIG. 7

| OWNED ITEM INFORMATION (3) | |
|---|---|
| OWNED ITEM INFORMATION (2) | |
| OWNED ITEM INFORMATION (1) | |
| OWNED ITEM ID | NUMBER OF OWNED ITEMS |
| 001 | 3 |
| 025 | 1 |
| 030 | 5 |
| . | . |
| . | . |

FIG. 8

| TRADE ID | LISTING ITEM ID | NUMBER OF LISTINGS | DESIRED ITEM ID | DESIRED NUMBER |
|---|---|---|---|---|
| 001 | 001 | 3 | 050 | 3 |
| ⋮ | ⋮ | ⋮ | ⋮ | ⋮ |

TRADE INFORMATION (1)
TRADE INFORMATION (2)
TRADE INFORMATION (3)

FIG. 9

SERVER DEVICE, NON-TRANSITORY SERVER DEVICE-READABLE STORAGE MEDIUM, AND GAME SYSTEM

CROSS-REFERENCE TO RELATED APPLICATIONS

The present application claims priority upon Japanese Patent Application No. 2012-147664 filed on Jun. 29, 2012, which is herein incorporated by reference.

BACKGROUND

1. Technical Field

This invention relates to a server device, a non-transitory server device-readable storage medium, and a game system.

2. Related Art

A server device is known that is connected to a first player terminal used by a first player and a second player terminal used by a second player so as to communicate with each other, and allows trading of items between the first player and the second player (for example, Japanese Laid-Open Patent Publication No. 2003-126555).

The player had to follow a complex procedure when the foregoing trade of items was carried out, so that there were cases where the player took the time and effort to perform operations for the trade.

SUMMARY OF THE INVENTION

The present invention has been conceived in view of the above issue, and an object thereof is to allow the player to trade items without taking time and effort.

An aspect of the invention to solve the above and other problems is a server device that is connected to a first player terminal used by a first player and a second player terminal used by a second player so as to communicate with each other, the server device including:

a storage unit that stores player information in which each of items owned by players is associated with each of the players;

a reception unit
that receives, from the first player terminal, an exchange request to exchange a first item owned by the first player for a second item different from the first item,
and receives, from the second player terminal after the exchange request, an acquisition request that the second player acquire the first item in an exchange source from the first player;

a judging unit that judges whether or not the second player owns the second item based on the player information when the reception unit receives the acquisition request; and an item exchange processing unit,
when the judging unit judges that the second player owns the second item, that sets the second item owned by the second player as a candidate item to be exchanged for the first item in the exchange source,
and when the judging unit judges that the second player does not own the second item, that transmits a game image for purchase to the second player terminal, the game image being for allowing the second player to purchase the second item.

Other features of this invention will become apparent from the description in the detailed description of the invention and the attached drawings.

BRIEF DESCRIPTION OF DRAWINGS

FIG. 4 illustrates an example of a data structure of card information.

FIG. 5 illustrates an example of a data structure of item information.

FIG. 6 illustrates an example of a data structure of player information.

FIG. 7 illustrates an example of a data structure of owned card information.

FIG. 8 illustrates an example of a data structure of owned item information.

FIG. 9 illustrates an example of a data structure of trade information.

DETAILED DESCRIPTION OF THE INVENTION

Figure 1:
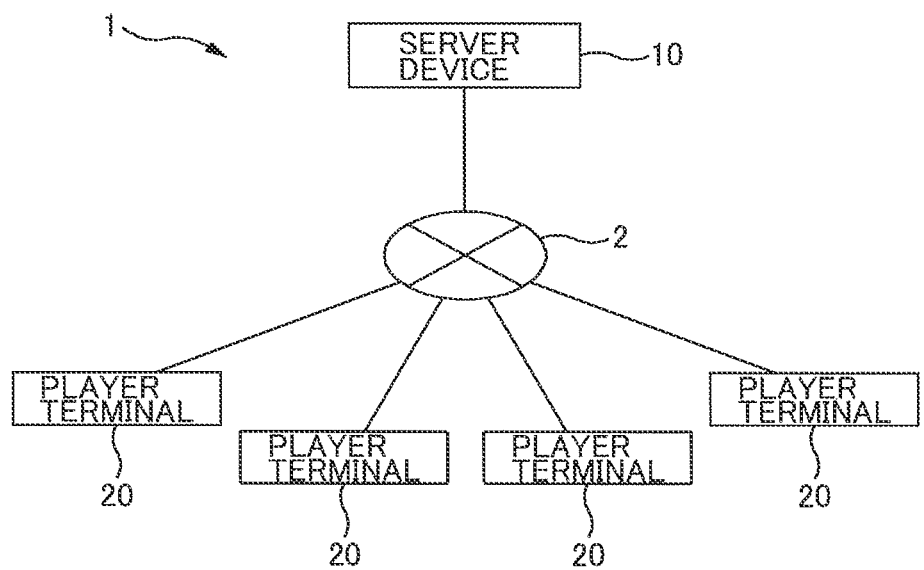
FIG. 1 illustrates an example of an overall configuration of a game system 1 according to the present embodiment.

With the detailed description of the present invention and the accompanied drawings, at least the following matters will be apparent.

A server device that is connected to a first player terminal used by a first player and a second player terminal used by a second player so as to communicate with each other, the server device including:

a storage unit that stores player information in which each of items owned by players is associated with each of the players;

a reception unit
that receives, from the first player terminal, an exchange request to exchange a first item owned by the first player for a second item different from the first item,
and receives, from the second player terminal after the exchange request, an acquisition request that the second player acquire the first item in an exchange source from the first player;

a judging unit that judges whether or not the second player owns the second item based on the player information when the reception unit receives the acquisition request; and an item exchange processing unit,
when the judging unit judges that the second player owns the second item, that sets the second item owned by the second player as a candidate item to be exchanged for the first item in the exchange source,
and when the judging unit judges that the second player does not own the second item, that transmits a game image for purchase to the second player terminal, the game image being for allowing the second player to purchase the second item.

According to such server device, when there is a shortage of second items to be traded, a game image for purchase for allowing the player to purchase the second item can be displayed on the player terminal immediately. Therefore, the player is allowed to trade items without taking time and effort.

In such a server device, it is acceptable that in the player information, the number of items owned by each of players is associated with each of the players, the reception unit receives, from the first player terminal, an exchange request to exchange M number of the first items for N number of the second items, M being a positive integer, N being a positive integer, and receives, from the second player terminal after the exchange request, an acquisition request that the second player acquire M number of the first items from the first player, the judging unit judges whether or not the number of the second items owned by the second player is more than the number N of the second items to be exchanged based on the player information, and when the judging unit judges that the number of the second items owned by the second player is less than the number N of the second items to be exchanged, the item exchange processing unit transmits a game image for purchase to the second player terminal, the game image being for allowing the second player to purchase the number of the second items required to be added to equal N.

According to such server device, when the number of second items to be traded is insufficient, a game image for purchase for allowing the player to purchase the number of second items required to be added can be displayed on the player terminal immediately. Therefore, the player is allowed to trade items without taking time and effort.

In such a server device, it is acceptable that the server device is connected to a third player terminal used by a third player who is different from the first player and the second player so as to communicate with each other, the reception unit receives, from the second player terminal, an acquisition request to acquire M number of the first items by accepting to exchange N number of the second items owned by the second player, and receives, from the third player terminal after the acquisition request from the second player terminal, an acquisition request that the third player acquire M number of the first items from the first player, when the reception unit receives the acquisition request transmitted from the third player terminal, the judging unit judges whether or not the number of the second items owned by the third player is more than the number N of the second items that the second player has accepted to exchange, based on the player information, and when the judging unit judges that the number of the second items owned by the third player is less than the number N of the second items that the second player has accepted to exchange, the item exchange processing unit transmits a game image for purchase to the third player terminal, the game image being for allowing the third player to purchase the number of the second items required to be added to be equal to or more than N.

According to such server device, when the number of second items owned by the third player is less than the number N of the second items that the second player has accepted to exchange, the third player needs the second items the number of which becomes more than the number thereof owned by the second player, and therefore a game image for purchase for allowing the player to purchase the number of second items required to be added to be equal to or more than N can be displayed on the player terminal immediately. This makes it possible to allow the third player to trade items without taking time and effort.

In such a server device, it is acceptable that the server device is connected to a third player terminal used by a third player who is different from the first player and the second player so as to communicate with each other, the reception unit receives, from the second player terminal, an acquisition request to acquire M number of the first items by accepting to exchange N number of the second items owned by the second player, and receives, from the third player terminal after the acquisition request from the second player terminal, an acquisition request that the third player acquire N number of the second items from the second player, when the reception unit receives the acquisition request transmitted from the third player terminal, the judging unit judges whether or not the number of the first items owned by the third player is more than the number M of the first items in the exchange source, based on the player information, and when the judging unit judges that the number of the first items owned by the third player is less than the number M of the first items in the exchange source, the item exchange processing unit transmits a game image for purchase to the third player terminal, the game image being for allowing the third player to purchase the number of the first items required to be added to be equal to or more than M.

According to such server device, when the number of first items owned by the third player is less than the number M of the first items in the exchange source, the third player needs the first items the number of which becomes more than the number thereof entered by the first player, and therefore a game image for purchase for allowing the player to purchase the number of first items required to be added to be equal to or more than M can be displayed on the player terminal immediately. This makes it possible to allow the third player to trade items without taking time and effort.

Present Embodiment

Configuration of Game System 1

FIG. 1 illustrates an example of an overall configuration of a game system 1 according to the present embodiment. The game system 1 provides various types of services related to games to a player over a network 2 (for example, the Internet and the like). The game system 1 includes a server device 10 and a plurality of player terminals 20.

<Configuration of Server Device 10>

Figure 2:
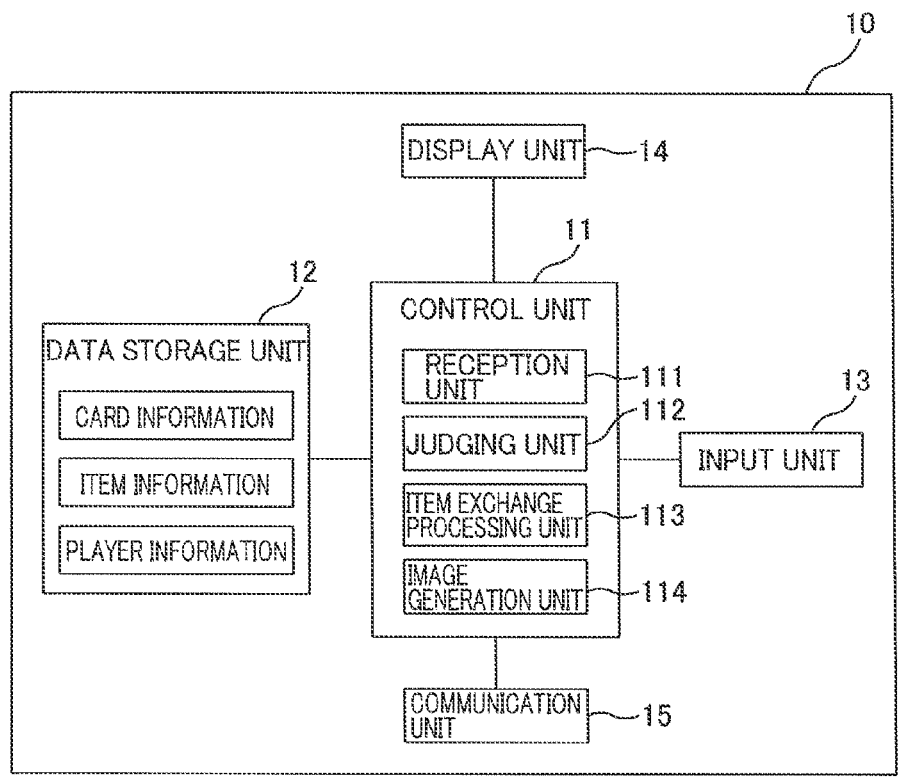
FIG. 2 is a block diagram of a functional configuration of a server device 10 according to the present embodiment.

FIG. 2 is a block diagram of a functional configuration of a server device 10 according to the present embodiment. The server device 10 is an information processing device (for example, a workstation, a personal computer, and the like) used by a person such as a system administrator when managing and controlling the game service. When the server device 10 receives various commands (requests) from the player terminal 20, the server device 10 is able to distribute a game program that is operable on the player terminal 20, web pages generated by a mark-up language (HTML and the like) suited to the standards of the player terminal 20, and the like. The server device 10 includes a control unit 11, a data storage unit 12, an input unit 13, a display unit 14, and a communication unit 15.

The control unit 11 is a unit that transfers data among the units and controls the entire server device 10, and is realized by a central processing unit (CPU) executing a program stored in a certain memory. The control unit 11 according to the present embodiment includes a reception unit 111, a judging unit 112, an item exchange processing unit 113, and an image generation unit 114.

The reception unit 111 has a function to perform a process for receiving various operational commands (requests) from the player through the player terminal 20 over the network 2. The judging unit 112 has a function to perform a process for judging whether or not trade conditions for exchanging an item on an item exchange market described below are satisfied (whether or not the trade is completed). The item exchange processing unit 113 has a function to perform various processes related to an item exchange based on the judgment result produced by the judging unit 112. The image generation unit 114 has a function to perform a process for generating various images (for example, Web pages linked to image data related to a game) to be displayed on the player terminal 20.

The data storage unit 12 has a read only memory (ROM) that is a read-only storage region in which system programs are stored, and a random access memory (RAM) that is a rewritable storage region which is used as a work area for computing processes performed by the control unit 11. The data storage unit 12 is realized, for example, by a non-volatile storage device such as a flash memory or a hard disk and the like. The data storage unit 12 according to the present embodiment stores card information, player information, and item information: the card information is information related to a game card used in a game; the player information is information related to the player; and the item information is information related to the item used in a game. The item gives a player advantages in game progress. The item is, for example, a tool, an ability and the like which can be used in a game. These pieces of information will be described later in detail.

The input unit 13 is a unit with which a system administrator, etc. input various types of data (card information, item information and the like), and is realized, for example, by a keyboard, a mouse, and the like.

The display unit 14 is a unit which displays operating screens for the system administrator according to commands from the control unit 11, and is realized, for example, by a liquid crystal display (LCD) and the like.

The communication unit 15 is a unit for performing communication with the player terminals 20, and has a function as a reception unit for receiving signals and various data transmitted from the player terminals 20, and a function as a transmission unit for transmitting the signals and various data to the player terminals 20 in accordance with commands from the control unit 11. The communication unit 15 is realized, for example, by a network interface card (NIC) and the like.

<Configuration of Player Terminal 20>

Figure 3:
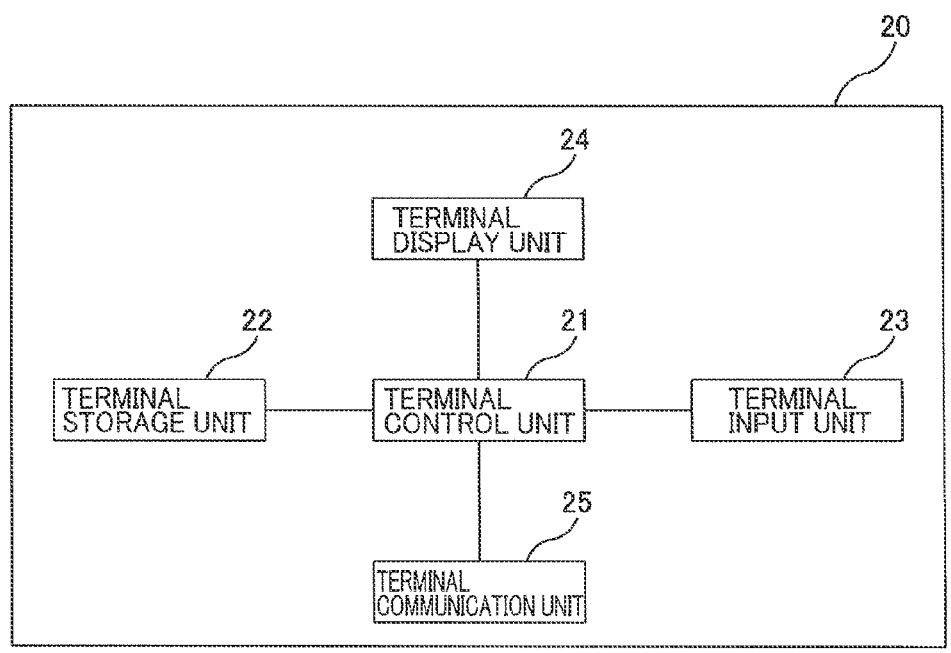
FIG. 3 is a block diagram of a functional configuration of a user terminal 20 according to the present embodiment.

FIG. 3 is a block diagram of a functional configuration of a player terminal 20. The player terminal 20 according to the present embodiment is an information processing device (for example, a mobile telephone terminal, a smartphone, and the like) used by a player when playing a game. The player terminal 20 is able to send a distribution request for various types of information (e.g., a game program and web pages) related to the game to the server device 10. Since the player terminal 20 also has a web browser function for allowing players to view web pages, the web pages (e.g., game play images) distributed from the server device 10 can be displayed on screens. The player terminal 20 includes a terminal control unit 21, a terminal storage unit 22, a terminal input unit 23, a terminal display unit 24, and a terminal communication unit 25.

The terminal control unit 21 is a unit that transfers data among the units and controls the entire player terminal 20. The terminal control unit 21 is realized by a central processing unit (CPU) executing a program stored in a certain memory. The terminal storage unit 22 is connected to the terminal control unit 21 through a bus. In accordance with commands from the terminal control unit 21, the data stored in the terminal storage unit 22 is looked up, read, and rewritten. The terminal storage unit 22 is realized, for example, by a flash memory or a hard disk and the like. The terminal input unit 23 is a unit with which the player performs various operations (game operations and the like), and is realized, for example, by an operating button, a touch screen or the like. The terminal display unit 24 is a unit for displaying a game screen (game image, operating image, and the like) according to commands from the terminal control unit 21, and is realized, for example, by a liquid crystal display (LCD) and the like. The terminal communication unit 25 is a unit for sending and receiving various information to/from the server device 10 over the network 2, and is realized, for example, by a network interface card (NIC) and the like.

<Data Structure>

FIG. 4 illustrates an example of a data structure of card information stored in the data storage unit 12. The card information includes items (fields) such as a card ID, a character name, the level of the character, attack power, defense power, and hit point. The card ID is identification information for identifying a game card. The character name is information indicative of display names of the character. The level of the character, the attack power, the defense power, and the hit point are parameters indicating a skill value set for the character.

FIG. 5 illustrates an example of a data structure of item information stored in the data storage unit 12. The item information includes items such as an item ID, an item name, and the price of the item. The item ID is identification information for identifying an item. The item name is information indicative of display names of the item. The price of the item is information indicative of a value of the item with virtual currency.

FIG. 6 illustrates an example of a data structure of player information stored in the data storage unit 12. The player information includes items such as a player ID, virtual currency, owned card information, owned item information, and trade information. The player ID is identification information for identifying a player. The virtual currency is information indicative of the amount of virtual currency owned by the player. The virtual currency is updated when the player acquires and spends virtual currency (when the player purchases an item). The owned card information is information indicative of a game card owned by the player (hereinafter referred to as an owned card). The owned item information is information indicative of an item owned by the player (hereinafter referred to as an owned item). The trade information is information related to the trade that the player has placed on the market for exchanging an item.

FIG. 7 illustrates an example of a data structure of owned card information included in the player information. The owned card information includes items such as an owned card ID, the level of the owned card, attack power, defense power, hit point, and acquisition dates and times. The owned card ID is identification information for identifying the owned card. The level of the owned card, the attack power, the defense power, and the hit point are parameters indicating a skill value set for the character associated with the owned card. The various parameters are updated in accordance with the result of the battle game and the like. The acquisition dates and times are information indicative of the dates and times when the player acquired the owned card.

FIG. 8 illustrates an example of a data structure of owned item information included in the player information. The owned item information includes items such as an owned item ID, and the number of owned items. The owned item ID is identification information for identifying an owned item. The number of owned items is information indicative of the number of owned items owned by him/herself.

FIG. 9 illustrates an example of a data structure of trade information included in the player information. The trade information includes items such as a trade ID, a listing item ID, the number of listings, a desired item ID, and a desired number. The trade ID is identification information for identifying the trade that the player has placed on the market. The listing item ID is an item ID associated with the item the player has listed in the trade (hereinafter referred to as a listing item). The number of listings is information indicative of the number of listing items. The desired item ID is an item ID associated with the item desired by the player in the trade (hereinafter referred to as a desired item). The desired number is information indicative of the number of the desired items.

<Game Outline>

An outline of the game provided by the game system 1 according to the present embodiment is described below. The game system 1 provides a battle game that is played using a game card (a virtual card used in a virtual space in the game) as one example of the game content, and an item exchange market for trading items available in the battle game.

(Battle Game)

In the game system 1 according to the present embodiment, the player can own a plurality of game cards each associated with a game character. The player can play a battle game by using a game card (character) selected from among a plurality of game cards that the player owns. The control unit 11 selects an enemy character that participated in the battle with the character associated with the game card selected by the player, and determines the outcome of the battle game between the characters based on various parameters (attack power, defense power, hit point and the like) set for each character.

The player can use an item in the battle game. For example, the player uses an item having a hit point recovery function, so that the control unit 11 is able to recover the hit point parameter set for the character.

Also, the player can purchase a desired item in the virtual currency, and acquire a desired item using the following item exchange market.

(Item Exchange Market)

In the game system 1 according to the present embodiment, the player can own a plurality of items available in the game. The player can place a trade for exchanging an item owned by him/herself for an item owned by the other player, by using an item exchange market. The trade of the item exchange is placed by the auction system. When the trade is completed, the player can acquire the item owned by the other player instead of giving the item owned by him/herself to the other player.

An example of operations when using the item exchange market will be explained below in detail.

<An Example of Operations of Game System 1>

Figure 10:
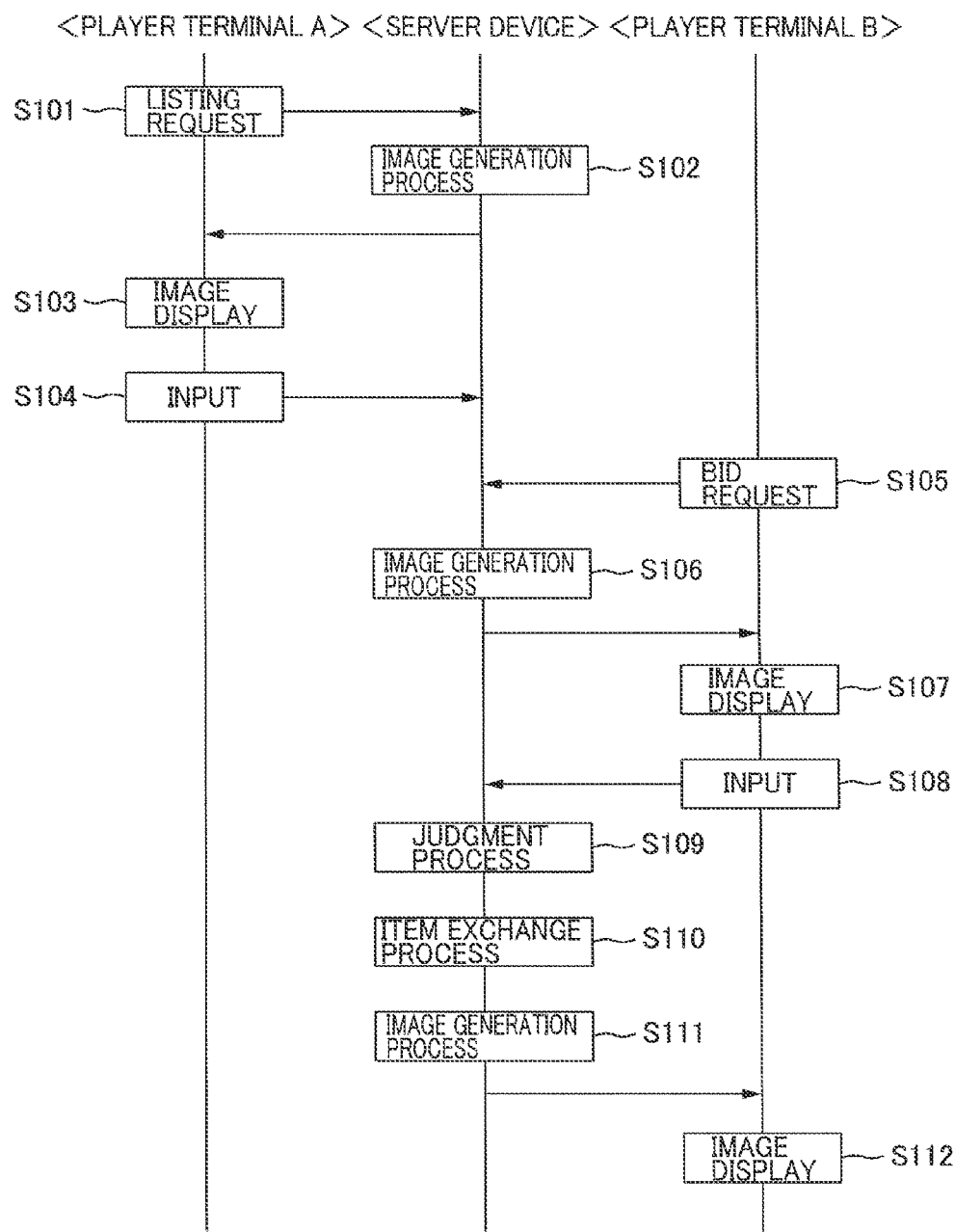
FIG. 10 is a flowchart describing an operation example of the game system 1 according to the present embodiment.

FIG. 10 is a flowchart describing an operation example of the game system 1 according to the present embodiment. Here, a player terminal 20 used by a player A (first player) is described as a player terminal A, and a player terminal 20 used by a player B (second player) is described as a player terminal B.

First, in the player terminal A, when the terminal control unit 21 receives a manipulated input performed by the player A (seller) from a terminal input unit 23, a listing request to list an item on the item exchange market is transmitted to the server device 10 through the terminal communication unit 25 (S101).

Next, in the server device 10, when the reception unit 111 receives the listing request which has been transmitted from the player terminal A, the image generation unit 114 generates an operating image (game image) for sellers who list an item (S102). The operating image is transmitted to the player terminal A that has issued the request through the communication unit 15.

Figure 11:
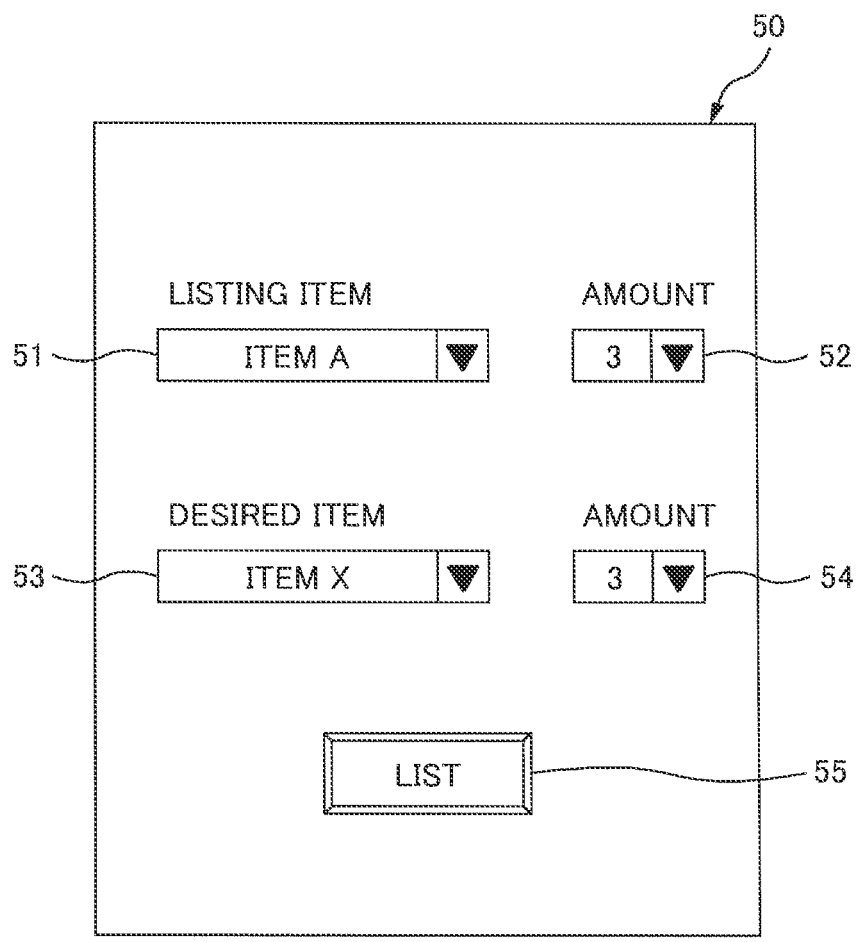
FIG. 11 illustrates an example of an operating image for sellers who list an item.

Next, the player terminal A causes the terminal display unit 24 to display the operating image for sellers which has been transmitted from the server device 10 (S103). FIG. 11 illustrates an example of an operating image 50 for sellers displayed on the terminal display unit 24. The player A selects a desired listing item from among selection items in a pull-down menu by operating a menu button 51, and selects the number of the desired listing items from among selection items in a pull-down menu by operating a menu button 52. Categories and the number of the listing items included in the selection items are extracted based on the owned item information (see FIG. 8) stored in the storage unit 12. Similarly, the player A selects a desired item and the number thereof to be exchanged by operating menu buttons 53 and 54. Then, after the listing item and desired item are confirmed, the player A selects a listing button 55. As shown in FIG. 11, in the present embodiment, "three" "item A"s are selected as the listing items, and "three" "item X"s are selected as the desired items by the operation of the player A.

Referring back to FIG. 10, when the listing item and the number thereof in an exchange source, and the desired item and the number thereof to be exchanged are entered by the player A with the manipulated input in this way, such operational information (exchange request to exchange the listing item owned by the player A for the desired item) is transmitted from the player terminal A to the server device 10 (S104). Then, the control unit 11 of the server device 10 receives the operational information (exchange request) transmitted from the player terminal A through the reception unit 111, and updates trade information (see FIG. 9) stored in the storage unit 12 based on the operational information (exchange request).

In this way, the trade entered by the player A (the exchange trade from the listing item to the desired item) is placed on the item exchange market.

In the player terminal B, when the terminal control unit 21 receives a manipulated input performed by the player B (bidder) from the terminal input unit 23, a bid request to bid for the listing item placed on the item exchange market is transmitted to the server device 10 through the terminal communication unit 25 (S105).

Then, in the server device 10, when the reception unit 111 receives the bid request transmitted from the player terminal B, the image generation unit 114 generates an operating image (game image) for bidders who bid for the listing item (S106). The operating image is transmitted to the player terminal B that has issued the request through the communication unit 15.

Figure 12:
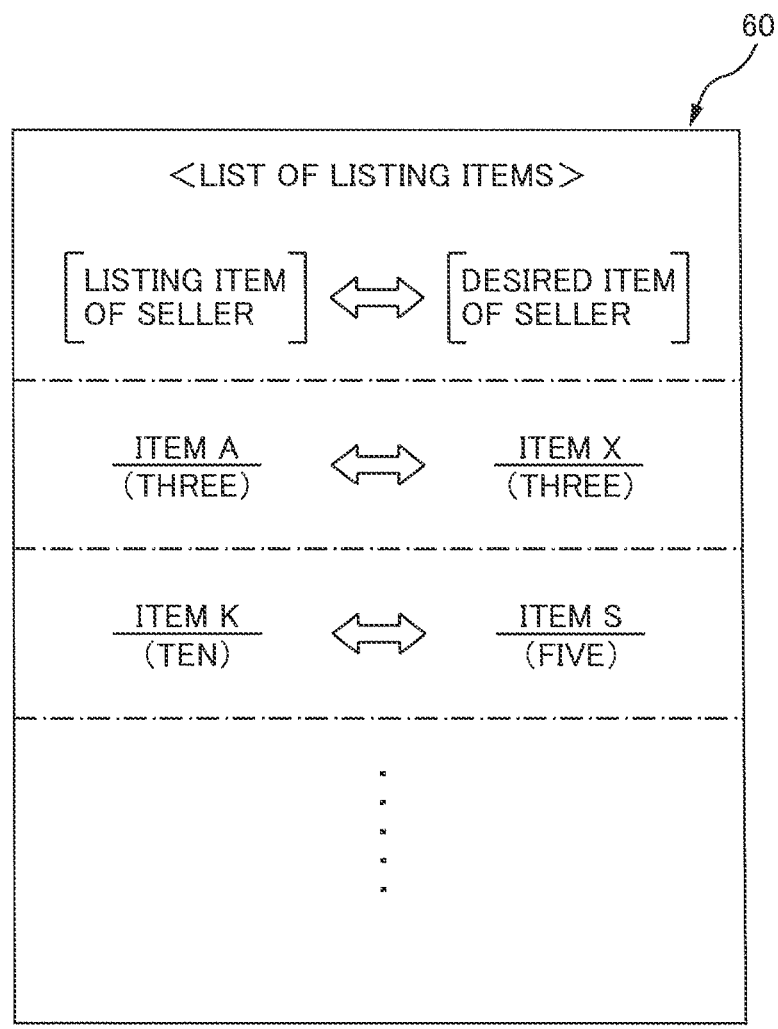
FIG. 12 illustrates an example of an operating image for bidders who bid for a listing item.

Next, the player terminal B causes the terminal display unit 24 to display the operating image for bidders which has been transmitted from the server device 10 (S107). FIG. 12 illustrates an example of an operating image 60 for bidders, which is displayed on the terminal display unit 24. In the operating image 60 for bidders, a list of the listing items distinguished at each trading item is displayed. The trading item is extracted based on the trade information (see FIG. 9) stored in the storage unit 12. The player B selects an item that the player B accepts to exchange, from among a plurality of trading items included in the list of the listing items. As shown in FIG. 12, in order to respond to the trade entered by the player A (see FIG. 11), that is, the trade for exchanging (three) "item A"s that are listing items for (three) "item X"s that are desired items, it is assumed that the (three) "item X"s are selected by the operation of the player B. With this selection, the player B has bid for the (three) "item A"s that the player B would like to acquire.

Referring back to FIG. 10, when the "item X" is selected by the operation of the player B in this way, such operational information (acquisition request that the player B acquire the listing item in the exchange source from the player A) is transmitted from the player terminal B to the server device 10 (S108).

Next, in the server device 10, when the reception unit 111 receives the operational information (acquisition request) transmitted from the player terminal B, the judging unit 112 performs a judgment process for judging whether or not the exchange trade of the item selected by the player B is completed (S109). The judging unit 112 refers to the owned item information (see FIG. 8) stored in the storage unit 12 to judge whether or not the player B owns the desired item to be exchanged. In the present embodiment, since the player B has bid for the (three) "item A"s listed by the player A (see FIG. 12), the judging unit 112 refers to the owned item information (see FIG. 8) to judge whether or not the number of "item X"s owned by the player B is equal to or more than "three".

Next, in the server device 10, based on the result judged by the judging unit 112, the item exchange processing unit 113 performs various processes related to the item exchange (S110).

In the present embodiment, when the judging unit 112 judges that the player B owns the (three) "item X"s that are desired items of the player A, the item exchange processing unit 113 set the (three) "item X"s owned by the player B as candidate items to be exchanged for the (three) "item A"s in the exchange source. Then, if there is no bid from other players, and a predetermined period (for example, one hour) has past, the (three) "item A"s listed by the player A are exchanged for the (three) "item X"s owned by the player B, and the owned item information (see FIG. 8) stored in the storage unit 12 is updated.

On the other hand, when the judging unit 112 judges that the player B does not own (three) "item X"s that are desired items of the player A, the item exchange processing unit 113 causes the image generation unit 114 to generate an operating image for purchase for allowing the player B to purchase the insufficient "item X" (S111). The operating image is transmitted to the player terminal B that has issued the request through the communication unit 15.

Note that, the image generation unit 114 can be made to generate the operating image for purchase only when the insufficient "item X" is an item the player B can purchase. Also, when the "item X" is an item that the player B can not purchase, the game image including an indication that "the item is insufficient" may be generated.

In this way, when the item to be traded is insufficient (or the number of items is insufficient), it is possible to display the operating image for purchase for allowing the player to purchase the insufficient item (or operating image for purchase for allowing the player to purchase the number of items required to be added) on the player terminal 20 immediately. This makes it possible for the player to trade the item without taking time and effort.

Figure 13:
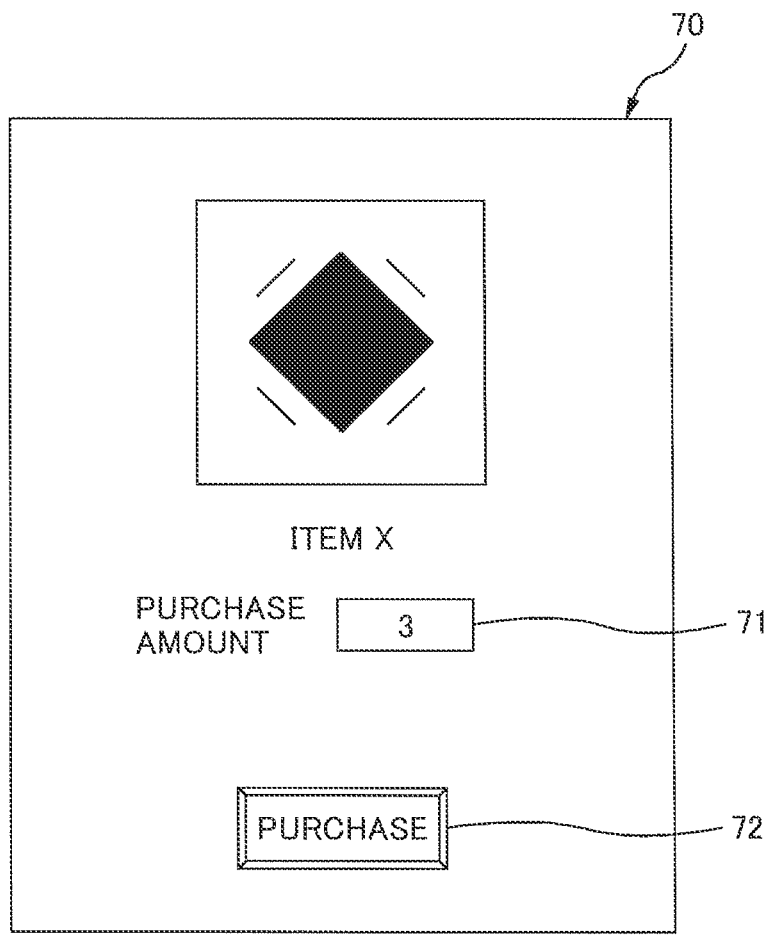
FIG. 13 illustrates an example of an operating image for purchasing an insufficient item.

Next, the player terminal B causes the terminal display unit 24 to display the operating image for purchase which has been transmitted from the server device 10 (S112). FIG. 13 illustrates an example of an operating image 70 for purchase displayed on the terminal display unit 24. In the operating image 70 for purchase, the number of insufficient items is displayed from the beginning without causing the player to operate the menu button and select a purchase quantity of the insufficient items. In the present embodiment, for example, when the number of "item X"s required to be added is "three" (when the player owns none of the "item X"s), "3" is displayed on a purchase quantity field 71 in the operating image 70 for purchase, as shown in FIG. 13. Moreover, for example, when it is judged that the number of "item X"s required to be added is "two" as a result of the judgment produced by the judging unit 112 (when "one" "item X" is owned), "2" is displayed on the purchase quantity field 71.

This makes it possible for the player B to purchase the insufficient "item X" without taking time and effort only by selecting a purchase button 72 in the operating image 70 for purchase, and complete the trade for exchanging the (three) "item A"s that are the listing items of the player A for the (three) "item X"s that have become owned items of him/herself.

<Other Example of Operations of Game System 1>

Figure 14:
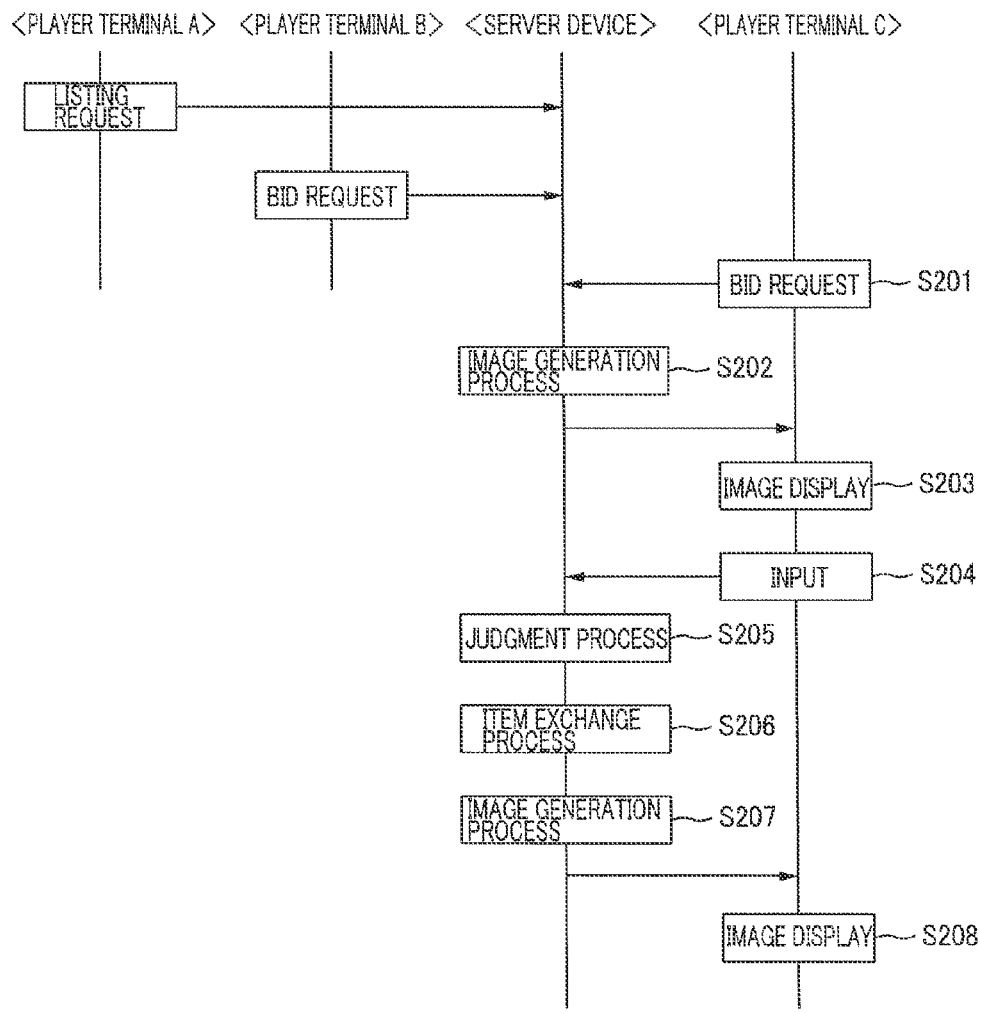
FIG. 14 is a flowchart describing another operation example of the game system 1 according to the present embodiment.

FIG. 14 is a flowchart describing the other example of operations of the game system 1 according to the present embodiment. Here, the player terminal 20 used by a player A (first player) is described as a player terminal A, the player terminal 20 used by a player B (second player) is described as a player terminal B, and the player terminal 20 used by a player C (third player) is described as a player terminal C.

The following describes operation examples of the game system 1 in the case where the reception unit 111 in the server device 10 receives a listing request on the item exchange market from the player terminal A based on a manipulated input performed by the player A (seller), the reception unit 111 then receives a bid request for the listing item placed on the item exchange market by the player A, from the player terminal B based on a manipulated input performed by the player B (bidder), and then the reception unit 111 further receives a bid request from the player terminal C based on a manipulated input performed by the player C (bidder).

First, when the player terminal C transmits, to the server device 10, a bid request for the listing item placed on the item exchange market based on the manipulated input performed by the player C (bidder) (S201), the server device 10 responds to the bid request, causes the image generation unit 114 to generate an operating image for bidders (S202), and transmits the operating image to the player terminal C that has issued the request.

Next, the player terminal C causes the terminal display unit 24 to display an operating image for bidders (see FIG. 12) which has been transmitted from the server device 10 (S203). The player C selects an item that the player C accepts to exchange, from among a plurality of trading items included in a list of the listing items. In the present embodiment, for example, the player C can select (three) "item X"s in the operating image 60 for bidders in order to acquire (three) "item A"s listed by the player A (see FIG. 12). This selection results in a bid from the player C for the (three) "item A"s owned by the player A. In such a case, the player B and the player C are to compete for acquiring the "item A"s owned by the player A. Additionally, for example, the player C can also select (three) "item A"s in the operating image 60 for bidders in order to acquire the (three) "item X"s that the player B has accepted to exchange when bidding. This selection results in a bid from the player C for the (three) "item X"s owned by the player B. In such a case, the player A and the player C are to compete for acquiring the "item X"s owned by the player B.

Referring back to FIG. 14, when the item is selected by the operation of the player C in this way, such operational information (acquisition request that the player C acquire the "item A" from the player A, or acquisition request that the player C acquire the "item X" from the player B) is transmitted from the player terminal C to the server device 10 (S204).

Next, in the server device 10, when the reception unit 111 receives the operational information (acquisition request) which has been transmitted from the player terminal C, the judging unit 112 executes a judgment process for judging whether or not the trade for exchanging the item selected by the player C is completed (S205). In the present embodiment, the player B and the player C compete against each other for the (three) "item A"s, or the player A and the player C compete against each other for the (three) "item X"s. Therefore, the following judgment process is executed by the judging unit 112.

First, when the reception unit 111 receives an acquisition request that the player C acquire the "item A" from the player A, the judging unit 112 judges whether or not the number of "item X"s owned by the player C is more than "three", which is the number of "item X"s the player B has bid for, by referring to the owned item information (see FIG. 8) stored in the storage unit 12. That is because the player C is not able to make a successful bid for the "item A" of the player A if the player C does not offer the "item X"s, to the player A, the number of which is more than the number of the "item X"s the player B has already bid for.

On the other hand, when the reception unit 111 receives an acquisition request that the player C acquire the "item X" from player B, the judging unit 112 judges whether or not the number of "item A"s owned by the player C is more than "three" that is the number of "item A"s listed by the player A, by referring to the owned item information (see FIG. 8) stored in the storage unit 12. That is because the player C is not able to make a successful bid for the "item X" of the player B if the player C does not offer the "item A"s, to the player B, the number of which is more than the number of "item A"s listed by the player A.

Next, in the server device 10, based on the judgment result performed by the judging unit 112, the item exchange processing unit 113 performs various processes related to the item exchange (S206).

First, in the case that the reception unit 111 receives an acquisition request for the "item A" requested by the player C, when the judging unit 112 judges that the player C owns "item X"s the number of which is more than "three", which is the number of "item X"s the player B has bid for, the item exchange processing unit 113 sets the "item X"s (the number of which is more than three) owned by the player C as candidate items to be exchanged for the (three) "item A"s in the exchange source. Then, if there is no bid from other players, and a predetermined period (for example, one hour) has past, the player C acquires the (three) "item A"s. Thus, the (three) "item A"s listed by the player A are exchanged for the "item X"s (the number of which is more than three) owned by the player C, and the owned item information (see FIG. 8) stored in the storage unit 12 is updated. Note that, when the above-mentioned judgment is made by the judging unit 112, or the number of "item X"s that the player C has bid for is equal to or more than a predetermined quantity (for example, equal to or more than 10), the item exchange processing unit 113 may cause the player C to acquire the (three) "item A"s in the exchange source immediately.

On the other hand, when the judging unit 112 judges that the player C owns "item X"s the number of which is less than "three", which is the number of "item X"s the player B has bid for, the item exchange processing unit 113 causes the image generation unit 114 to generate an operating image for purchase for allowing the player C to purchase the number of "item X"s required to be added to be equal to or more than "three" (S207). The operating image is transmitted to the player terminal C that has issued the request through the communication unit 15.

In this way, the player C can bid for the trade for exchanging the "item X"s, the number of which is more than the number of "item X"s the player B has already bid for, for the "item A"s listed by the player A without taking time and effort.

Compared to this, in the case that the reception unit 111 receives an acquisition request for "item X" requested by the player C, when the judging unit 112 judges that the player C owns "item A"s the number of which is more than "three", which is the number of "item A"s listed by the player A, the item exchange processing unit 113 sets the "item A"s (the number of which is more than three) owned by the player C as candidate items to be exchanged for the (three) "item X"s in the exchange source. Then, if there is no bid from other players, and a predetermined period (for example, one hour) has past, the player C acquires the (three) "item X"s. Thus, the (three) "item X"s of the player B are exchanged for the "item A"s (the number of which is more than three) of the player C, and the owned item information (see FIG. 8) stored in the storage unit 12 is updated.

On the other hand, when the judging unit 112 judges that the player C owns "item A"s the number of which is less than "three", which is the number of "item A"s listed by the player A, the item exchange processing unit 113 causes the image generation unit 114 to generate an operating image for purchase for allowing the player C to purchase the number of "item A"s required to be added to be equal to or more than "three" (S207). The operating image is transmitted to the player terminal C that has issued the request through the communication unit 15.

In this way, the player C can bid for the trade for exchanging the "item A"s, the number of which is more than the number thereof listed by the player A, for the "item X"s of the player B without taking time and effort.

Next, the player terminal C causes the terminal display unit 24 to display the operating image for purchase which has been transmitted from the server device 10 (S208).

Figure 15:
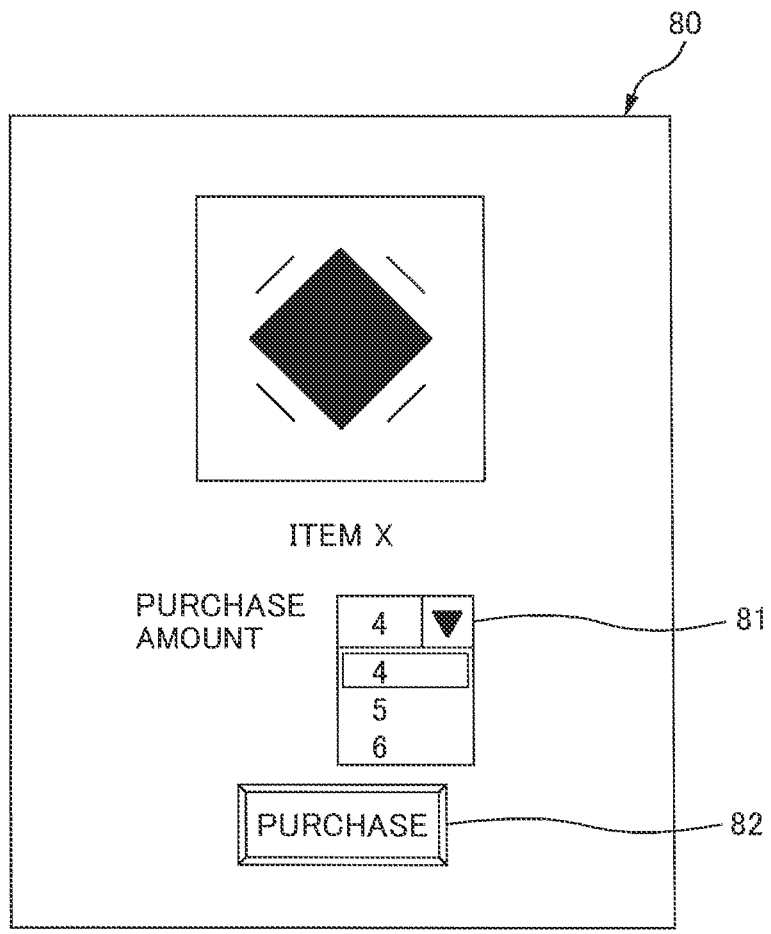
FIG. 15 illustrates an example of an operating image for purchasing an insufficient item.

First, when the player C would like to acquire the "item A" of the player A, in a operating image 80 for purchase shown in FIG. 15, the player C selects a desired purchase quantity from among selection items in a pull-down menu by operating a menu button 81, and then selects a purchase button 82. The purchase quantity included in the selection items are set so that the player C owns more items than that the player B has already bid for. In the present embodiment, for example, when the player C owns none of the "item X"s, the number (zero) of "item X"s owned by the player C is three less than the number (three) the player B has already bid for. Therefore, the number that is equal to or more than "4" is displayed in the selection items of the menu button 81 (the numbers "1" to "3" are not displayed).

Moreover, when the player C would like to acquire the "item X" of the player B, an operating image 80 for purchase similar to that of FIG. 15 is also displayed on terminal display unit 24 (the image of "item A" instead of "item X" is displayed). That is, for example, when the player C owns none of the "item A"s, the number (zero) of "item A"s owned by the player C is three less than the number (three) the player A has listed. Therefore, the number that is equal to or more than "4" is displayed in the selection items of the menu button 81 (the numbers "1" to "3" are not displayed).

In this way, the player C can purchase the "item X" and bid for the "item A" of the player A without taking time and effort only by selecting a purchase quantity in the operating image 80 for purchase. Similarly, the player C can purchase the "item A" and bid for the "item X" of the player B without taking time and effort only by selecting a purchase quantity in the operating image 80 for purchase.

Other Embodiments

The present embodiment is for facilitating understanding of the present invention and does not intend to limit the interpretation of the present invention. Variations and modifications may be made in accordance with the spirit and scope of the present invention and equivalents thereof are included in the present invention. In particular, embodiments described below are to be included in the present invention.

<Operating Image for Sellers>

In the aforementioned present embodiment, when the control unit 11 judges that the player owns items the number of which is equal to or more than a predetermined number by referring to the owned item information stored in the storage unit 12, the control unit 11 may allow the image generation unit 114 to generate an operating image for sellers including an indication that encourages the player to list the above item. This makes it possible to actively exchange the item that has become unnecessary.

<Operating Image for Bidders>

In the aforementioned present embodiment, by storing past trade information that is information of the trades which have ever been completed, as a history in the storage unit 12, the control unit 11 may allow the image generation unit 114 to generate an operating image for bidders including a list of past trades based on the history. Also, in the operating image 60 for bidders, the appropriate number of items that match the market price based on the history information may be presented to the player. Thereby, the probability of completing a trade can be increased.

<Server Device>

The present embodiment has described the game system 1 including one server device 10 as an example. However, the present invention is not limited in this way. A plurality of server devices may be connected via a network, and each server device may execute various types of distributed processing.

What is claimed is:

1. A server device that is connected to a first player terminal used by a first player and a second player terminal used by a second player such that the server device and the terminals can all communicate with each other, wherein the server device comprises:
 a storage unit configured to store player information related to the ownership of items associated with each of the players;
 a reception unit configured to receive, from the first player terminal, an exchange request to exchange a first item owned by the first player for a second item different from the first item, and further configured to receive, from the second player terminal, after the exchange request, an acquisition request to acquire the first item from the first player;
 a judging unit configured to determine whether or not the second player owns the second item based on the player information when the reception unit receives the acquisition request; and
 an item exchange processing unit configured to set, when the judging unit determines that the second player owns the second item, the second item owned by the second player as a candidate item to be exchanged for the first item, and further configured to transmit, when the judging unit determines that the second player does not own the second item, a game image for purchase to the second player terminal, wherein the game image allows the second player to purchase the second item, prior to the exchange process.

2. A server device according to claim 1, wherein the player information comprises a value indicating the number of items owned by each of the players,
 wherein the reception unit is further configured to receive, from the first player terminal, an exchange request to exchange M number of the first items for N number of the second items, wherein M is a positive integer, and N is a positive integer, and is further configured to receive, from the second player terminal, after the exchange request, an acquisition request to acquire M number of the first items from the first player,
 wherein the judging unit is further configured to determine whether or not the number of the second items owned by the second player is greater than or equal to the number N of the second items to be exchanged based on the player information, and
 wherein the item exchange processing unit is configured to transmit, when the judging unit determines that the number of the second items owned by the second player is less than the number N of the second items to be exchanged, a game image for purchase to the second player terminal, wherein the game image allows the second player to purchase the number of the second items required to be added to equal N.

3. A server device according to claim 2, wherein the server device is further connected to a third player terminal used by a third player who is different from the first player and the second player such that the server device and the terminals can all communicate with each other,
 wherein the reception unit is further configured to receive, from the second player terminal, an acquisition request to acquire M number of the first items by accepting to exchange N number of the second items owned by the second player, and to receive, from the third player terminal, after the acquisition request from the second player terminal, an acquisition request to acquire M number of the first items from the first player,
 wherein the judging unit is further configured to determine, when the reception unit receives the acquisition request transmitted from the third player terminal, whether or not the number of the second items owned by the third player is more than the number N of the second items that the second player has accepted to exchange, based on the player information, and
 wherein the item exchange processing unit is further configured to transmit, when the judging unit judges that the number of the second item owned by the third player is less than the number N of the second items that the second player has accepted to exchange, a game image for purchase to the third player terminal, wherein the game image allows the third player to purchase the number of the second items required to be added to be equal to or more than N.

4. A server device according to claim 2, wherein the server device is connected to a third player terminal used by a third player who is different from the first player and the second player such that the server device and the terminals can all communicate with each other,
wherein the reception unit is further configured to receive, from the second player terminal, an acquisition request to acquire M number of the first items by accepting to exchange N number of the second items owned by the second player, and to receive, from the third player terminal, after the acquisition request from the second player terminal, an acquisition request to acquire N number of the second items from the second player,
wherein the judging unit is further configured to determine, when the reception unit receives the acquisition request transmitted from the third player terminal, whether or not the number of the first items owned by the third player is more than the number M of the first items, based on the player information, and
wherein the item exchange processing unit is configured to transmit, when the judging unit determines that the number of the first items owned by the third player is less than the number M of the first items, a game image for purchase to the third player terminal, wherein the game image allows the third player to purchase the number of the first items required to be added to be equal to or greater than M.

5. A non-transitory server device-readable storage medium storing a program executed by a server device that is connected to a first player terminal used by a first player and a second player terminal used by a second player such that the server device and the terminals can all communicate with each other, wherein the program comprises instructions that when executed cause the server device to:
perform a process to store, in a storage unit player information related to the ownership of items associated with each of the players;
perform a reception process to receive, from the first player terminal, an exchange request to exchange a first item owned by the first player for a second item different from the first item, and to receive, from the second player terminal after the exchange request, an acquisition request to acquire the first item in an exchange source from the first player;
perform a judgment process to determine whether or not the second player owns the second item based on the player information when the acquisition request is received in the reception process; and
perform an item exchange process to set, when it is determined that the second player owns the second item in the judgment process, the second item owned by the second player as a candidate item to be exchanged for the first item, and to transmit when it is determined that the second player does not own the second item in the judgment process, a game image for purchase to the second player terminal, wherein the game image allows the second player to purchase the second item, prior to the exchange process.

6. A game system comprising:
a first player terminal configured to be used by a first player;
a second player terminal configured to be used by a second player; and
a server device connected to the first player terminal and the second player terminal such that the server device and the terminals can all communicate with each other,
wherein the first player terminal is configured to transmit, to the server device, an exchange request to exchange a first item owned by the first player for a second item different from the first item,
wherein the second player terminal is configured to transmit, to the server device, an acquisition request to acquire the first item from the first player,
wherein the server device comprises
a storage unit configured to store player information related to the ownership of items associated with each of the players,
a reception unit configured to receive the exchange request from the first player terminal and to receive the acquisition request from the second player terminal after the exchange request,
a judging unit configured to determine whether or not the second player owns the second item based on the player information when the reception unit receives the acquisition request, and
an item exchange processing unit configured to set, when the judging unit determines that the second player owns the second item, the second item owned by the second player as a candidate item to be exchanged for the first item, and configured to transmit, when the judging unit determines that the second player does not own the second item, that transmits a game image for purchase to the second player terminal, wherein the game image allows the second player to purchase the second item, prior to the exchange process.

* * * * *